(12) United States Patent
Li et al.

(10) Patent No.: US 9,785,018 B2
(45) Date of Patent: Oct. 10, 2017

(54) TOUCH LIQUID CRYSTAL DISPLAY AND METHOD OF CONTROLLING THE SAME

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Xianxiang Zhang, Shanghai (CN); Yingying Xu, Shanghai (CN); Xiaoye Li, Shanghai (CN); Gang Liu, Shanghai (CN); Xingyao Zhou, Shanghai (CN); Kang Yang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 70 days.

(21) Appl. No.: 14/700,097

(22) Filed: Apr. 29, 2015

(65) Prior Publication Data

US 2016/0178974 A1 Jun. 23, 2016

(30) Foreign Application Priority Data

Dec. 22, 2014 (CN) .......................... 2014 1 0826469

(51) Int. Cl.
*G06F 3/041* (2006.01)
*G06F 3/044* (2006.01)
(Continued)

(52) U.S. Cl.
CPC ...... *G02F 1/134336* (2013.01); *G02F 1/1362* (2013.01); *G02F 1/13458* (2013.01);
(Continued)

(58) Field of Classification Search
CPC ...... G06F 3/041; G06F 3/0412; G06F 3/0416; G06F 3/044; G02F 1/13338;
(Continued)

(56) References Cited

U.S. PATENT DOCUMENTS

2011/0291963 A1* 12/2011 Woo ...................... G06F 3/0412
345/173
2012/0235948 A1* 9/2012 Inoue .................. G02F 1/13338
345/173
(Continued)

FOREIGN PATENT DOCUMENTS

| CN | 101681221 A | 3/2010 |
| CN | 103809792 A | 5/2014 |
| CN | 103902110 A | 7/2014 |

*Primary Examiner* — Nathan Danielsen
(74) *Attorney, Agent, or Firm* — Anova Law Group, PLLC

(57) ABSTRACT

A touch liquid crystal display is disclosed. The display includes a TFT array substrate, and an opposite substrate opposite to the TFT array substrate. The TFT array substrate and the opposite substrate collectively define a display area and a non-display area. In addition, the opposite substrate includes a first substrate, a plurality of first electrodes, and a plurality of second electrodes, where the plurality of first electrodes are located in the display area of the first substrate, and the plurality of second electrodes are located in the non-display area of the first substrate. The TFT array substrate includes a second substrate, and a plurality of third electrodes, where the third electrodes are located in the display area of the second substrate and are opposite the first electrodes, and where the third electrodes are common electrodes of the TFT array substrate.

18 Claims, 8 Drawing Sheets

(51) Int. Cl.
*G02F 1/1343* (2006.01)
*G02F 1/1362* (2006.01)
*G02F 1/1345* (2006.01)
*G02F 1/1333* (2006.01)

(52) U.S. Cl.
CPC ............ *G06F 3/044* (2013.01); *G06F 3/0412* (2013.01); *G06F 3/0416* (2013.01); *G02F 2001/133388* (2013.01)

(58) Field of Classification Search
CPC ........... G02F 1/133514; G02F 1/13439; G02F 1/134356; G02F 1/1368; G02F 2001/133388; G02F 1/13458; G02F 1/1362
See application file for complete search history.

(56) References Cited

U.S. PATENT DOCUMENTS

| | | | |
|---|---|---|---|
| 2014/0111466 A1* | 4/2014 | Kim | G06F 3/044 345/174 |
| 2014/0191770 A1* | 7/2014 | Lefebvre | G06F 3/044 324/681 |
| 2014/0253501 A1* | 9/2014 | Noguchi | G06F 3/044 345/174 |
| 2015/0309634 A1* | 10/2015 | Lee | G06F 3/0412 345/173 |

* cited by examiner

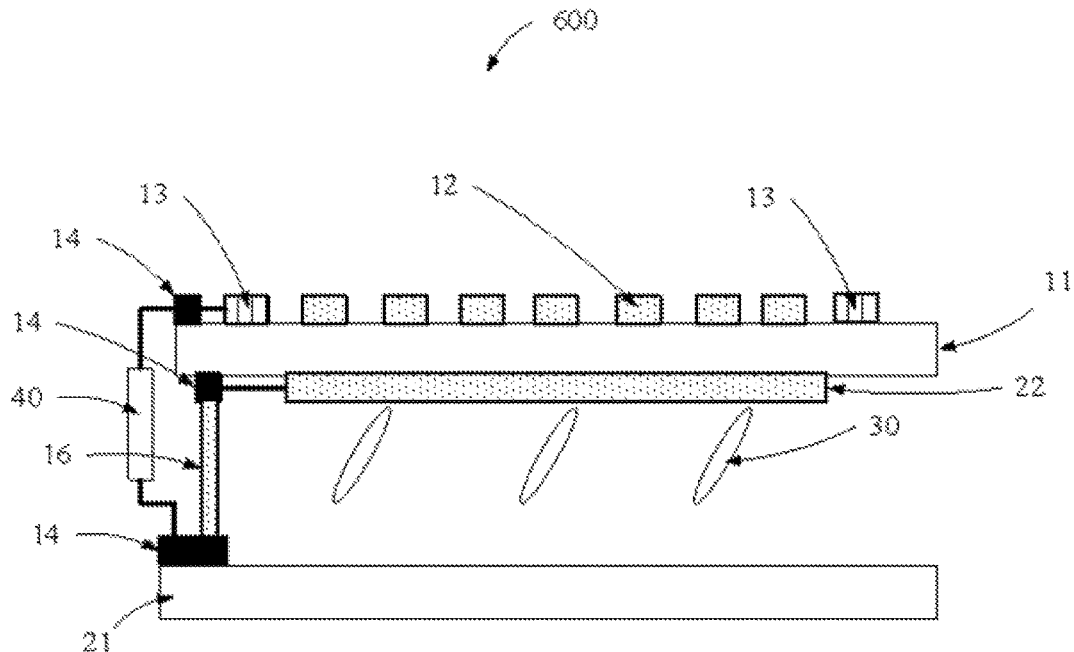

FIG. 7

| Applying a first scanning signal to the plurality of third electrodes 22, and detecting a change of coupling capacitance between the plurality of first electrodes 12 and the plurality of third electrodes 22 by the plurality of first electrodes 12 to obtain a coordinate of a touch on the display area | S10 |

| Applying a second scanning signal to the plurality of non-display area electrodes, and detecting a change of coupling capacitance between the plurality of first electrodes 12 and the plurality of non-display area electrodes by the plurality of first electrodes 12 to obtain a coordinate of a touch on the non-display area | S11 |

FIG. 8

TOUCH LIQUID CRYSTAL DISPLAY AND METHOD OF CONTROLLING THE SAME

CROSS-REFERENCES TO RELATED APPLICATIONS

This application claims the benefit of priority to Chinese Patent Application No. 201410826469.0, filed with the Chinese Patent Office on Dec. 22, 2014 and entitled "TOUCH LIQUID CRYSTAL DISPLAY AND METHOD OF CONTROLLING THE SAME", the content of which is incorporated herein by reference in its entirety.

TECHNICAL FIELD

The present disclosure relates to the field of display technologies and particularly to a touch liquid crystal display and a method of controlling the same.

BACKGROUND OF THE INVENTION

In the existing touch liquid crystal display, the touch electrodes of the touch panel are generally located inside of the display panel to decrease the overall thickness and production cost thereof. Particularly, the common electrodes of the liquid crystal display are concurrently used as the touch electrodes of the touch panel. Since the common electrodes are located only in the display area of liquid crystal display but no common electrodes are located in a non-display area, a touch area of liquid crystal display is limited to the display area, and the touch function becomes inoperative in the non-display area of the touch panel, i.e., an edge area, thus degrading the touch performance of the touch liquid crystal display.

BRIEF SUMMARY OF THE INVENTION

One inventive aspect is a touch liquid crystal display. The display includes a TFT array substrate, and an opposite substrate opposite to the TFT array substrate. The TFT array substrate and the opposite substrate collectively define a display area and a non-display area. In addition, the opposite substrate includes a first substrate defining the display area and the non-display area, a plurality of first electrodes, and a plurality of second electrodes, where the plurality of first electrodes are located in the display area of the first substrate, and the plurality of second electrodes are located in the non-display area of the first substrate. The TFT array substrate includes a second substrate defining the display area and the non-display area, and a plurality of third electrodes, where the third electrodes are located in the display area of the second substrate and are opposite the first electrodes, and where the third electrodes are common electrodes of the TFT array substrate.

Another inventive aspect is a method of controlling a touch liquid crystal display, where the touch liquid crystal display includes a TFT array substrate and an opposite substrate opposite to the TFT array substrate, where the TFT array substrate and the opposite substrate collectively define a display area and a non-display area, where the opposite substrate includes a first substrate defining the display area and the non-display area, a plurality of first electrodes, and a plurality of second electrodes, where the plurality of first electrodes are located in the display area of the first substrate, and the plurality of second electrodes are located in the non-display area of the first substrate, where the TFT array substrate includes a second substrate defining the display area and the non-display area, and a plurality of third electrodes, where the third electrodes are located in the display area of the second substrate and are opposite the first electrodes, and where the third electrodes are common electrodes of the TFT array substrate, where the method includes applying a first scanning signal to the third electrodes, detecting a change of coupling capacitance between the first electrodes and the third electrodes with the of first electrodes to obtain a coordinate of a touch in the display area, applying a second scanning signal to the second electrodes, and detecting a change of coupling capacitance between the first electrodes and the second electrodes by the first electrodes to obtain a coordinate of a touch in the non-display area.

Another inventive aspect is a method of controlling a touch liquid crystal display, where the touch liquid crystal display includes a TFT array substrate and an opposite substrate opposite to the TFT array substrate, where the TFT array substrate and the opposite substrate collectively define a display area and a non-display area, where the opposite substrate includes a first substrate defining the display area and the non-display area, a plurality of first electrodes, and a plurality of second electrodes, where the plurality of first electrodes are located in the display area of the first substrate, and the plurality of second electrodes are located in the non-display area of the first substrate, where the TFT array substrate includes a second substrate defining the display area and the non-display area, and a plurality of third electrodes, where the third electrodes are located in the display area of the second substrate and are opposite the first electrodes, and where the third electrodes are common electrodes of the TFT array substrate, where the method includes applying a first scanning signal to the first electrodes or to the third electrodes, detecting a change of coupling capacitance between the first electrodes and the third electrodes with the first electrodes or the third electrodes without the first scanning signal applied thereto, to obtain a coordinate of a touch on the display area, applying a second scanning signal to the plurality of second electrodes, and detecting self capacitance of the second electrodes by the second electrodes, to obtain a coordinate of a touch on the non-display area.

BRIEF DESCRIPTION OF THE DRAWINGS

FIG. 7 illustrates a sectional view of a touch liquid crystal display according to an embodiment of the present disclosure.

FIG. 8 illustrates a flow chart of a method of controlling a touch liquid crystal display according to an embodiment of the present disclosure.

DETAILED DESCRIPTION OF THE PREFERRED EMBODIMENTS

Figure 1:
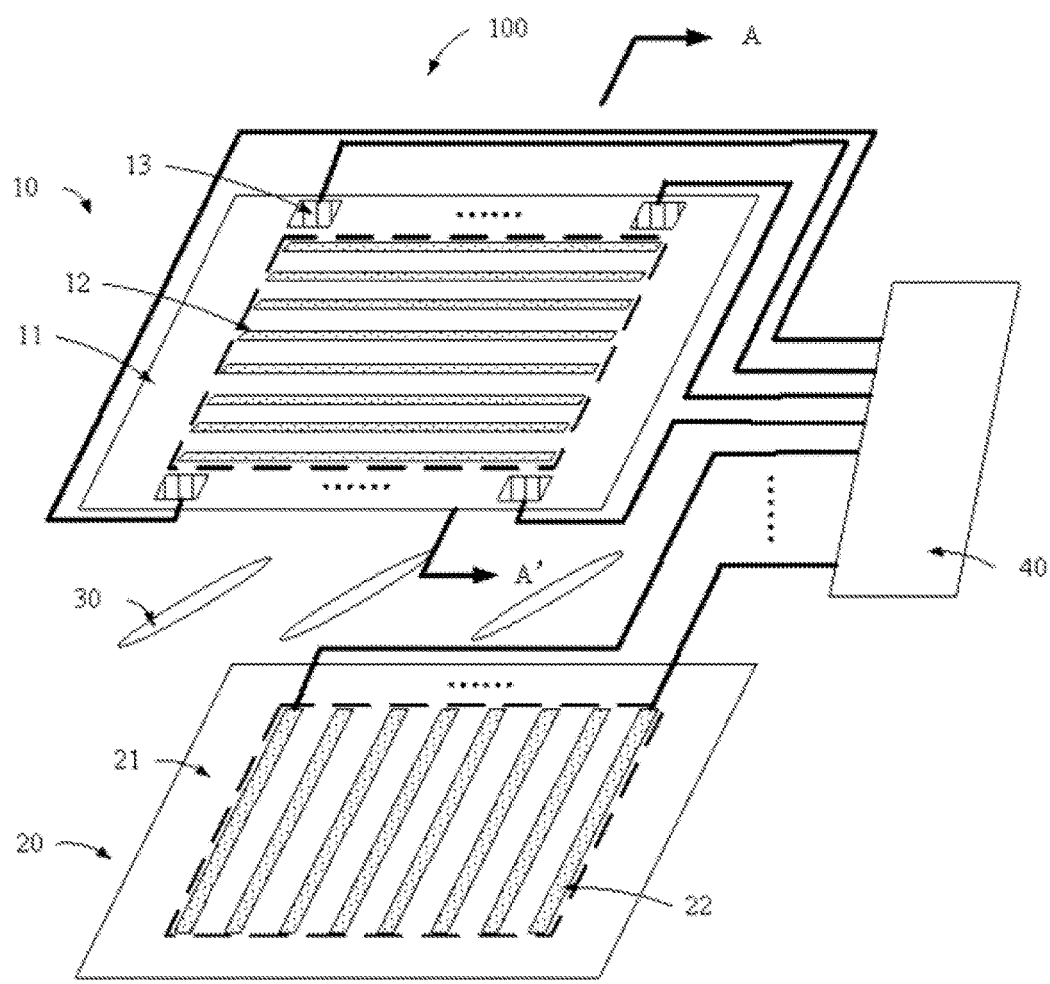
FIG. 1 illustrates a schematic structural diagram of a touch liquid crystal display according to an embodiment of the present disclosure.

Implementations of a touch liquid crystal display and a method of controlling the same according to the embodiments of the present disclosure will be described below in details with reference to the drawings.

The shapes and thicknesses of respective structures in the drawings will not reflect the real scale of an array substrate or an opposite substrate but are merely intended to illustrate the present disclosure.

As illustrated in FIG. 1, a touch liquid crystal display 100 according to an embodiment of the present disclosure includes: an opposite substrate 10, a TFT array substrate 20, a liquid crystal layer 30 and a flexible printed circuit board 40. The opposite substrate 10 and the TFT array substrate 20 are located opposite to each other. The liquid crystal layer 30 is located between the opposite substrate 10 and the TFT array substrate 20. The flexible printed circuit board 40 is electrically connected with the opposite substrate 10 and the TFT array substrate 20. The opposite substrate 10 and the TFT array substrate 20 collectively define a display area and a non-display area.

Figure 2:
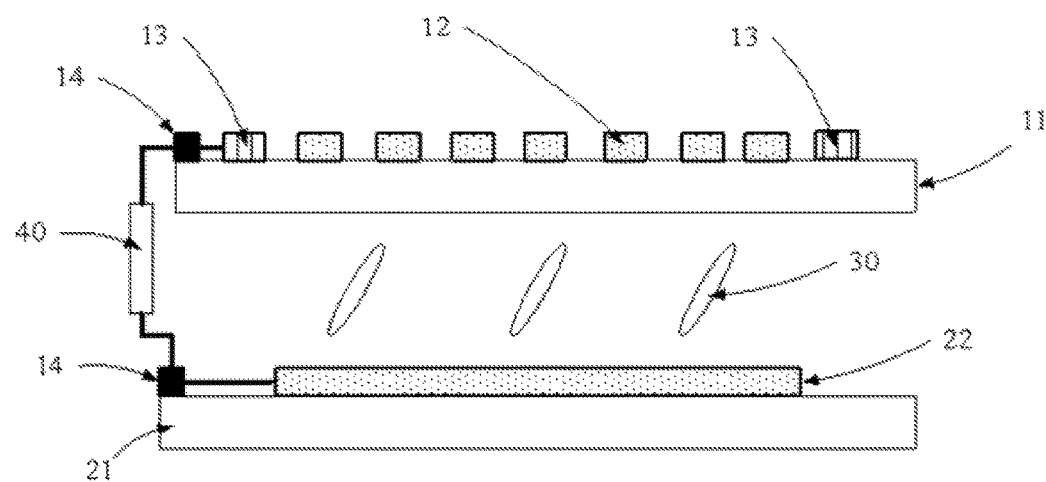
FIG. 2 illustrates a sectional view of the touch liquid crystal display in FIG. 1 taken along the AA' direction.

The opposite substrate 10 can be a color filter substrate or other substrate. The opposite substrate 10 can include a first substrate 11 defining the display area and the non-display area, a plurality of first electrodes 12 and a plurality of second electrodes 13. The plurality of first electrodes 12 and the plurality of second electrodes 13 are located on surfaces of the first substrate 11. Particularly, the plurality of first electrodes 12 are located in the display area of the first substrate 11, the plurality of second electrodes 13 are located in the non-display area of the first substrate 11. Furthermore, the plurality of first electrodes 12 and the plurality of second electrodes 13 can be located on the same surface or different surfaces of the first substrate 11. When the plurality of first electrodes 12 and the plurality of second electrodes 13 are located on the same surface of the first substrate 11, the plurality of first electrodes 12 and the plurality of second electrodes 13 can be formed by a same pattern process using a same mask. In one embodiment, the plurality of first electrodes 12 and the plurality of second electrodes 13 are located on the surface of the first substrate 11 facing away from the TFT array substrate 20. The plurality of first electrodes 12 are spaced apart from one another and substantially extend along a first direction. The plurality of second electrodes 13 are spaced apart from one another along the first direction and on two opposite sides of the first substrate 11. As illustrated in FIG. 2, which is a sectional view of FIG. 1 taken along the AA', each of the plurality of second electrodes 13 is electrically connected with the flexible printed circuit board 40 through a wire terminal 14. The plurality of first electrodes 12 can be driving electrodes or sensing electrodes. The plurality of second electrodes 13 can be driving electrodes, or sensing electrodes, or both driving electrodes and sensing electrodes. In one embodiment, the plurality of first electrodes 12 are sensing electrodes and the plurality of second electrodes 13 are driving electrodes.

The TFT array substrate 20 includes a second substrate 21 and a plurality of third electrodes 22. The plurality of third electrodes 22 are located in the display area of the second substrate 21 and opposite the plurality of first electrodes 12. The plurality of third electrodes 22 are spaced apart from one another and substantially extend along the second direction. The first direction intersects the second direction to form an angle which is above 0° and smaller than or equal to 90°. In one embodiment, the angle is about 90°. Each of the plurality of third electrodes 22 are electrically connected with the flexible printed circuit board 40 through a wire terminal 14. The plurality of third electrodes 22 can be concurrently used as the common electrodes of the TFT array substrate 20. Moreover, the plurality of third electrodes 22 can be driving electrode or sensing electrode. In the embodiment, the plurality of third electrodes 22 are driving electrodes.

As can be understood, in the display area, the plurality of first electrodes 12 intersect the plurality of third electrodes 22 and opposite the plurality of third electrodes 22, thus touch function can be implemented by mutual capacitance. In the non-display area, the touch function can be implemented by self capacitance of the plurality of second electrodes 13, or can be implemented by mutual capacitance between the plurality of second electrodes 13 and the plurality of first electrodes 12. Therefore, the touch function of the touch liquid crystal display 100 can be improved.

Figure 3:
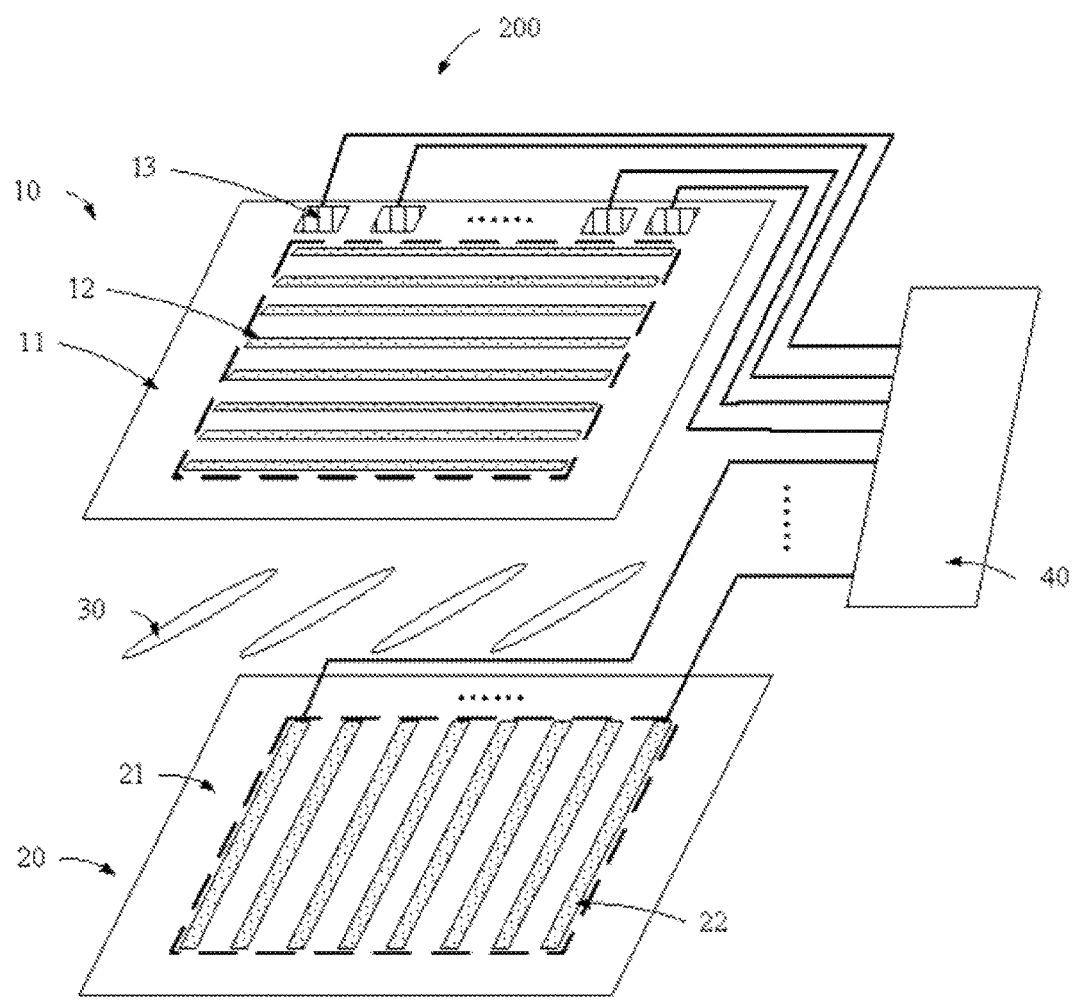
FIG. 3 illustrates a schematic structural diagram of a touch liquid crystal display according to an embodiment of the present disclosure.

Referring to FIG. 3, an embodiment of the present disclosure provides a touch liquid crystal display 200. The structure of touch liquid crystal display 200 is substantially the same as that of touch liquid crystal display 100, the difference is that the plurality of second electrodes 13 are spaced apart one another along the first direction and located on one side of the first substrate 11.

Figure 4:
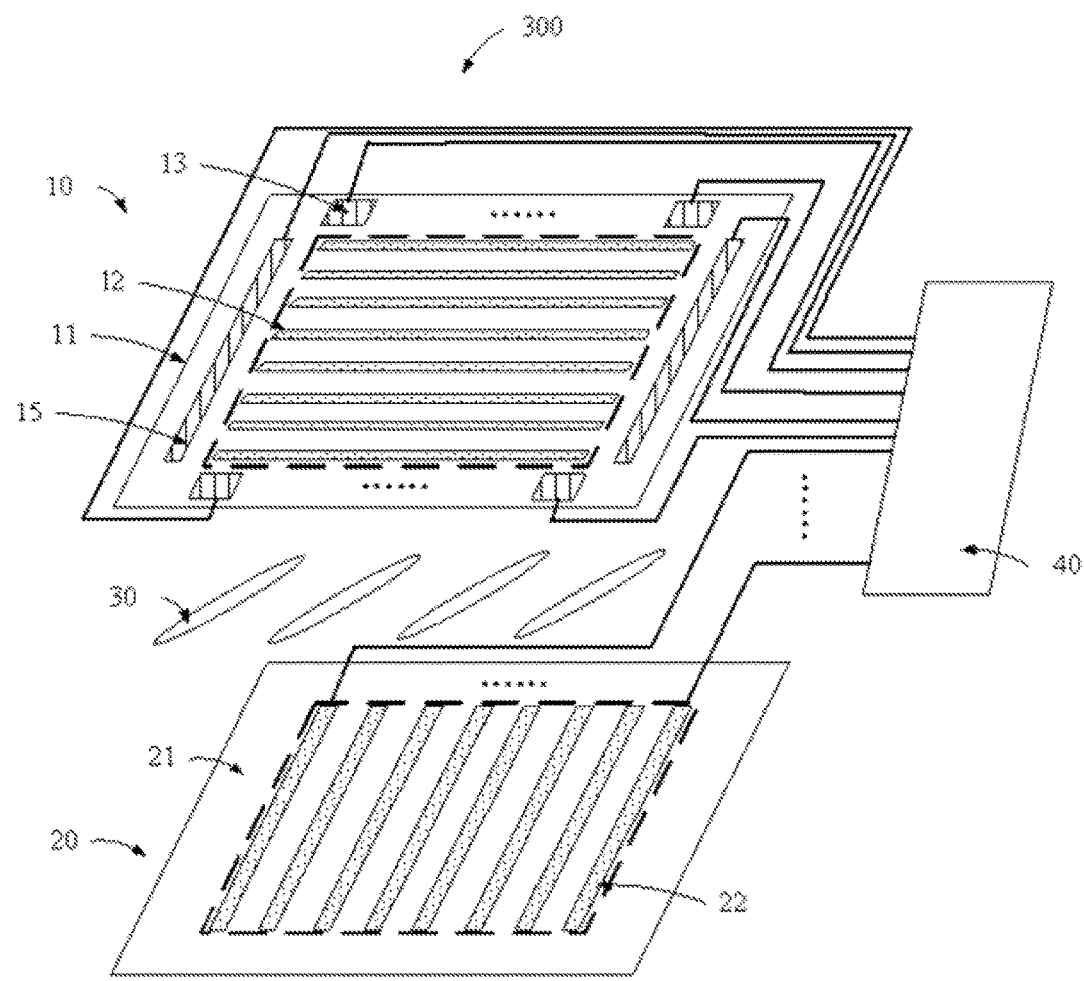
FIG. 4 illustrates a schematic structural diagram of a touch liquid crystal display according to an embodiment of the present disclosure.

Referring to FIG. 4, an embodiment of the present disclosure provides a touch liquid crystal display 300. The structure of touch liquid crystal display 300 is substantially the same as that of touch liquid crystal display 100, the difference is that the opposite substrate 10 further includes a plurality of the fourth electrodes 15 which have strip shapes. The plurality of fourth electrodes 15 are located in the non-display area of the first substrate 11. Particularly, the plurality of fourth electrodes 15 are located on two opposite sides of the first substrate 11 perpendicular to the first direction. Furthermore, the plurality of fourth electrodes 15 can be located on the same surface of the plurality of first substrate 11 as the plurality of first electrodes 12 and the plurality of second electrodes 13, or be located on the different surfaces of the plurality of first substrate 11 from the plurality of first electrodes 12 and the plurality of second electrodes 13. When the plurality of fourth electrodes 15, the plurality of first electrodes 12 and the plurality of second electrodes 13 are located on the same surface of the first substrate 11, the plurality of fourth electrodes 15, the plurality of first electrodes 12 and the plurality of second electrodes 13 can be formed by one pattern process using a same mask. In the embodiment, the plurality of fourth electrodes 15 are located on the surface of the first substrate 11 facing away from the TFT array substrate 20. Each of the plurality of fourth electrodes 15 is electrically connected to the flexible printed circuit board 40 by a wire terminal 14. The plurality of fourth electrodes 15 can be driving electrodes or the sensing electrodes. In the embodiment, the plurality of fourth electrodes 15 are both the driving electrodes and the sensing electrodes.

Figure 5:
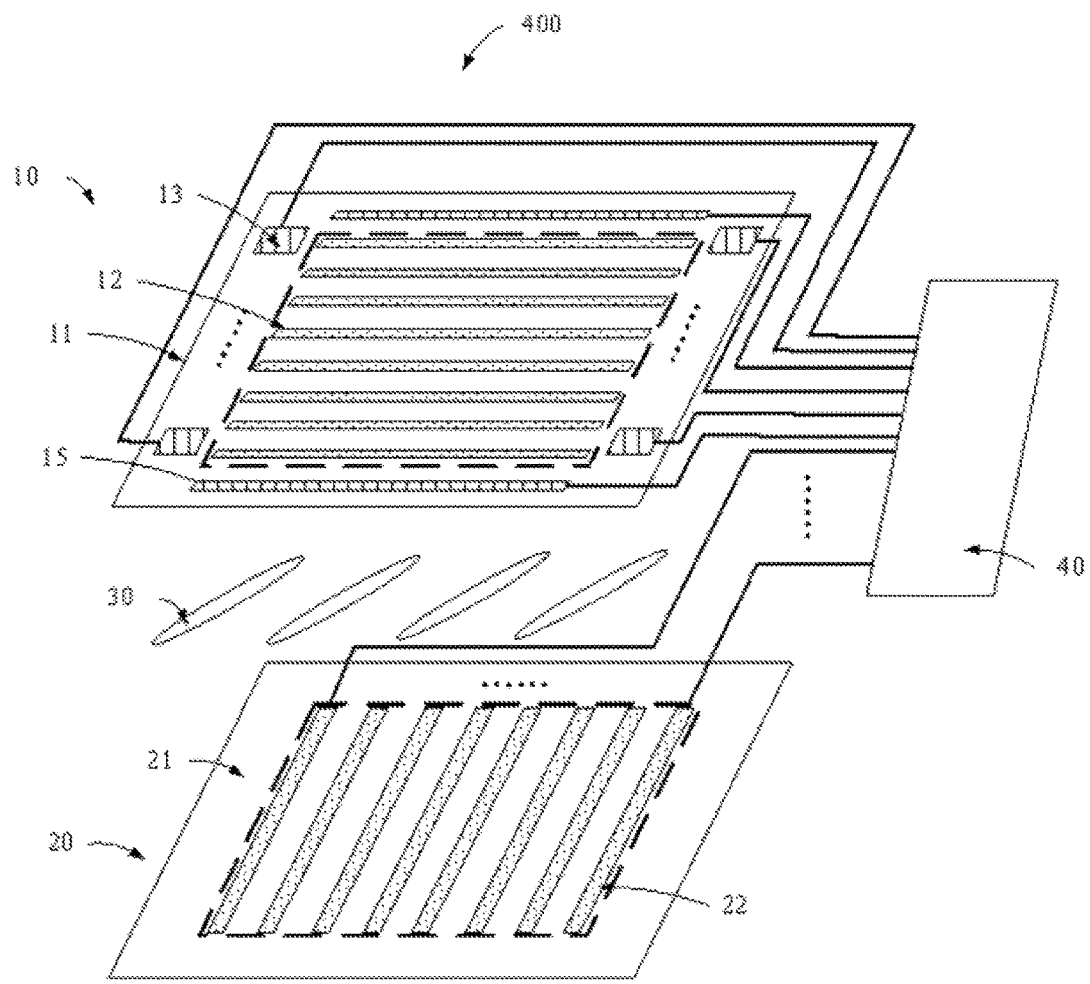
FIG. 5 illustrates a schematic structural diagram of a touch liquid crystal display according to an embodiment of the present disclosure.

Referring to FIG. 5, an embodiment of the present disclosure provides a touch liquid crystal display 400. The structure of touch liquid crystal display 400 is substantially the same as that of touch liquid crystal display 300, the difference is that the plurality of fourth electrodes 15 are located parallel on two sides of the first substrates 11 parallel to the first direction, and the plurality of second electrodes 12 are located on two sides of the first substrate 11 perpendicular to the first direction.

Figure 6:
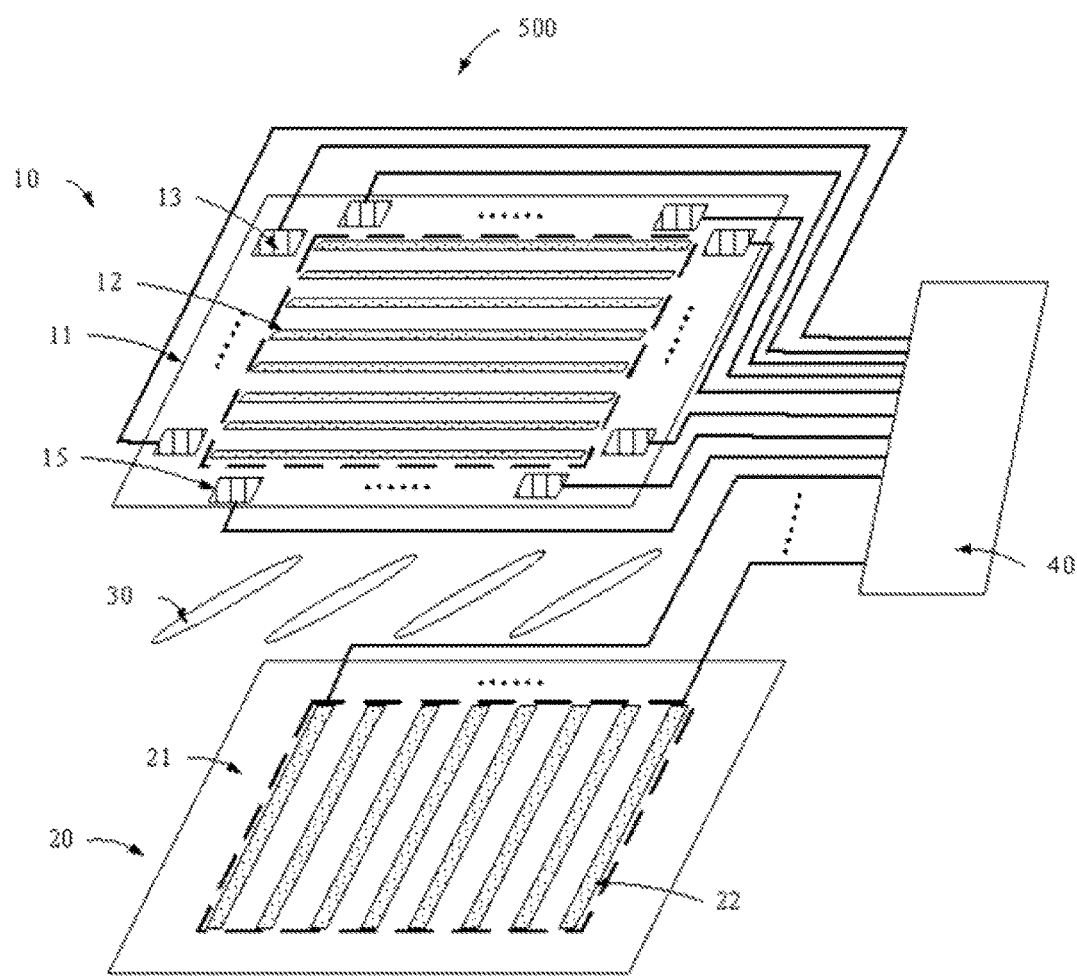
FIG. 6 illustrates a schematic structural diagram of a touch liquid crystal display according to an embodiment of the present disclosure.

Referring to FIG. 6, an embodiment of the present disclosure provides a touch liquid crystal display 500. The structure of touch liquid crystal display 500 is substantially the same as that of touch liquid crystal display 400, the difference is that the plurality of fourth electrodes 15 have sheet shapes, and are spaced apart from one another on two sides of the first substrates 11 perpendicular to the first direction.

Referring to FIG. 7, an embodiment of the present disclosure provides a touch liquid crystal display 600. The structure of touch liquid crystal display 600 is substantially the same as that of touch liquid crystal display 100, the difference is that the plurality of third electrodes 22 are located on the surface of the first substrate 11 close to the liquid crystal layer 30. Moreover, the plurality of third electrodes 22 can be electrically connected with the flexible printed circuit board 40 through the wire terminal 14 and the conductive adhesive 10 located on the first substrate 11 and the second substrate 21.

The touch liquid crystal display according to the embodiments of the present disclosure can be applied to a mobile phone, a tablet PC, a TV set, a display, a notebook PC, a digital frame, a navigator and any other product or component.

For convenient description, the plurality of second electrodes 13 and the plurality of fourth electrodes 15 in the non-display area are defined as a plurality of non-display area electrodes. Referring to FIG. 8, a method of controlling liquid crystal display according to the embodiment of the present disclosure, includes:

S10: applying a first scanning signal to the plurality of third electrodes 22, and detecting a change of coupling capacitance between the plurality of first electrodes 12 and the plurality of third electrodes 22 with the plurality of first electrodes 12 to obtain a coordinate of a touch on the display area; and S11: applying a second scanning signal to the non-display area electrodes, and detecting a change of coupling capacitance between the plurality of first electrodes 12 and the plurality of non-display area electrodes with the plurality of first electrodes 12 to obtain a coordinate of a touch on the non-display area.

The perform order of steps S10 and S11 is not limited thereto.

Figure 9:
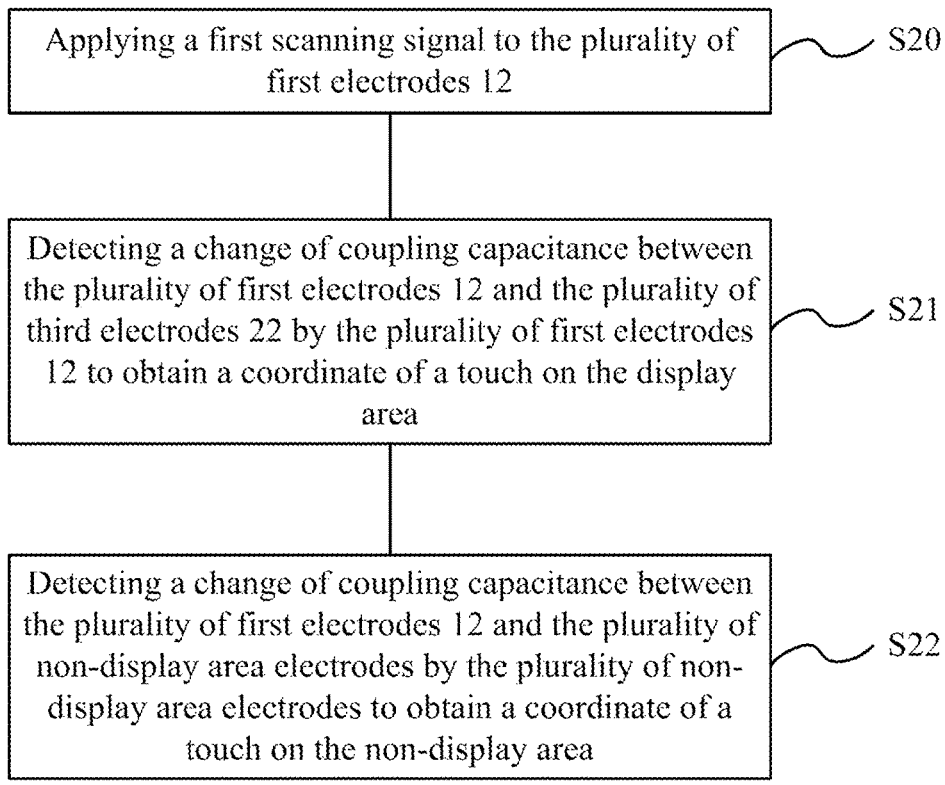
FIG. 9 illustrates a flow chart of a method of controlling a touch liquid crystal display according to an embodiment of the present disclosure.

Referring to FIG. 9, a method of controlling liquid crystal display according to another embodiment of the present disclosure, includes:

S20: applying a first scanning signal to the plurality of first electrodes 12;

S21: detecting a change of coupling capacitance between the plurality of first electrodes 12 and the plurality of third electrodes 22 with the plurality of first electrodes 12 to obtain a coordinate of a touch on the display area; and S22: detecting a change of coupling capacitance between the plurality of first electrodes 12 and the plurality of non-display area electrodes with the plurality of non-display area electrodes to obtain a coordinate of a touch on the non-display area.

The step S21 and the step S22 can be performed at the same time or can be performed separately. In one embodiment, the steps S21 and S22 are performed at the same time to save time.

Figure 10:
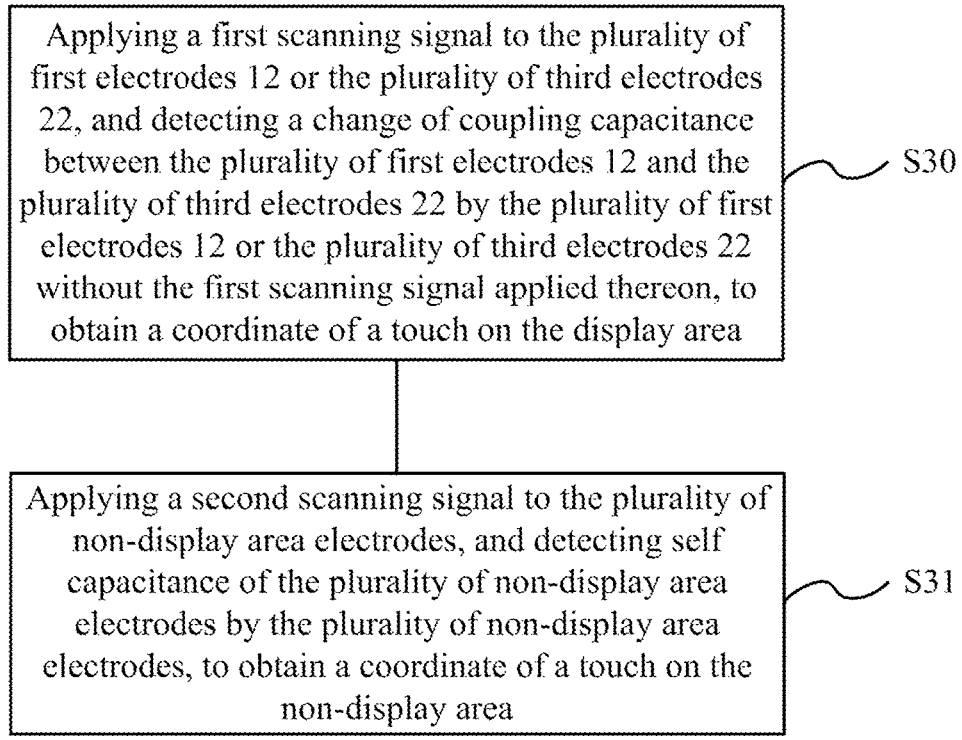
FIG. 10 illustrates a flow chart of a method of controlling a touch liquid crystal display according to an embodiment of the present disclosure.

Referring to FIG. 10, a method of controlling liquid crystal display according to another embodiment of the present disclosure, includes:

S30: applying a first scanning signal to the plurality of first electrodes 12 or to the plurality of third electrodes 22, and detecting a change of coupling capacitance between the plurality of first electrodes 12 and the plurality of third electrodes 22 with the plurality of first electrodes 12 or the plurality of third electrodes 22 without the first scanning signal applied thereto, to obtain a coordinate of a touch on the display area; and S31: applying a second scanning signal to the plurality of non-display area electrodes, and detecting self capacitance of the plurality of non-display area electrodes with the plurality of non-display area electrodes to obtain a coordinate of a touch on the non-display area.

The steps S30 and S31 can be performed at the same time or different time. In one embodiment, the steps S30 and S31 are performed substantially at the same time to save scan time. An intensity of the first scanning signal can be the same as an intensity of the second scanning signal or can be different from the intensity of second scanning signal. Particularly, the intensity of first scanning signal can be stronger than or equal to the intensity of second scanning signal.

Evidently those skilled in the art can make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

What is claimed is:

1. A touch liquid crystal display, comprising:
a thin-film-transistor (TFT) array substrate; and
an opposite substrate opposite to the TFT array substrate,
wherein: the TFT array substrate and the opposite substrate collectively define a display area and a non-display area,
the opposite substrate comprises:
a first substrate, a plurality of first electrodes, and a plurality of second electrodes,
wherein the plurality of first electrodes are located in the display area of the first substrate but not in the non-display area of the first substrate, and the plurality of second electrodes are located in the non-display area of the first substrate, and
the TFT array substrate comprises:
a second substrate, and a plurality of third electrodes,
wherein the third electrodes are located in the display area of the second substrate and are opposite the first electrodes, and wherein the third electrodes are common electrodes of the TFT array substrate,
wherein a touch in the non-display area is detected based on a change of coupling capacitance between the first electrodes, and the second electrodes by the first electrodes.

2. The touch liquid crystal display according to claim 1, wherein the first electrodes are driving electrodes, and the second electrodes and the third electrodes are sensing electrodes.

3. The touch liquid crystal display according to claim 1, wherein the first electrodes are driving electrodes, the third electrodes are sensing electrodes, and the plurality of second electrodes comprises both driving electrodes and sensing electrodes.

4. The touch liquid crystal display according to claim 1, wherein the second electrodes and the third electrodes are driving electrodes, and the first electrodes are sensing electrodes.

5. The touch liquid crystal display according to claim 1, wherein the third electrodes are driving electrodes, the first electrodes are sensing electrodes, and the plurality of second electrodes comprises both driving electrodes and sensing electrodes.

6. The much liquid crystal display according to claim 1, wherein the first electrodes extend along a first direction and are spaced apart from one another, the third electrodes extend along a second direction and are spaced apart from one another, and the first direction intersects the second direction.

7. The touch liquid crystal display according to claim 6, wherein the first direction is substantially perpendicular to the second direction.

8. The touch liquid crystal display according to claim 1, wherein the first electrodes and the second electrodes are located on a same surface of the first substrate.

9. The touch liquid crystal display according to claim 8, wherein the first electrodes and the second electrodes are located on a surface of the first substrate facing away from the TFT array substrate.

10. The touch liquid crystal display according to claim 1, the opposite substrate is a color filter substrate.

11. The touch liquid crystal display according to claim 1, further comprising a flexible printed circuit board, wherein the third electrodes are electrically connected with the second electrodes by the flexible printed circuit board.

12. The touch liquid crystal display according to claim 11, further comprising a wire terminal located in the non-display area, wherein the third electrodes and the second electrodes are respectively electrically connected with the flexible printed circuit board by the wire terminal.

13. The touch liquid crystal display according to claim 1, wherein each of the second electrodes has a strip shape, a sheet shape, or a combination of a strip shape and a sheet shape, and wherein the second electrodes are spaced apart from one another on at least one side of the display area.

14. The touch liquid crystal display according to claim 13, wherein each of the plurality of second electrodes has a sheet shape, and the second electrodes are spaced apart from one another at periphery of the display area.

15. A method of controlling a touch liquid crystal display, wherein the touch liquid crystal display comprises a thin-film-transistor (TFT) array substrate and an opposite substrate opposite to the TFT array substrate, wherein the TFT array substrate and the opposite substrate collectively define a display area and a non-display area, wherein the opposite substrate comprises a first substrate, a plurality of first electrodes, and a plurality of second electrodes, wherein the plurality of first electrodes are located in the display area of the first substrate but not in the non-display area of the first substrate, and the plurality of second electrodes are located in the non-display area of the first substrate, wherein the TFT array substrate comprises a second substrate, and a plurality of third electrodes, wherein the third electrodes are located in the display area of the second substrate and are opposite the first electrodes, and wherein the third electrodes are common electrodes of the TFT array substrate, wherein the method comprises:

applying a first scanning signal to the third electrodes;
detecting a change of coupling capacitance between the first electrodes and the third electrodes with the first electrodes to obtain a coordinate of a touch in the display area;
applying a second scanning signal to the second electrodes; and
detecting a change of coupling capacitance between the first electrodes and the second electrodes by the first electrodes to obtain a coordinate of a touch in the non-display area.

16. A method of controlling a touch liquid crystal display, wherein the touch liquid crystal display comprises a thin-film-transistor (TFT) array substrate and an opposite substrate opposite to the TFT array substrate, wherein the TFT array substrate and the opposite substrate collectively define a display area and a non-display area, wherein the opposite substrate comprises a first substrate, a plurality of first electrodes, and a plurality of second electrodes, wherein the plurality of first electrodes are located in the display area of the first substrate but not in the non-display area of the first substrate, and the plurality of second electrodes are located in the non-display area of the tint substrate, wherein the TFT array substrate comprises a second substrate, and a plurality of third electrodes, wherein the third electrodes are located in the display area of the second substrate and are opposite the first electrodes, and wherein the third electrodes are common electrodes of the TFT array substrate, wherein the method comprises:

applying a first scanning signal to the first electrodes or to the third electrodes;
detecting a change of coupling capacitance between the first electrodes and the third electrodes with the first electrodes or the third electrodes without the first scanning signal applied thereto, to obtain a coordinate of a touch on the display area;
applying a second scanning signal to the plurality of second electrodes; and
detecting a self capacitance of the second electrodes by the second electrodes, to obtain a coordinate of a touch on the non-display area.

17. The method according to claim 16, wherein applying the first and second scanning signals are performed substantially at the same time.

18. The method according to claim 16, wherein the first scanning signal is the same as the second scanning signal.

* * * * *